T. L. Yates,
Circular Sawing Machine,
Nº 56,138.      Patented July 3, 1866.
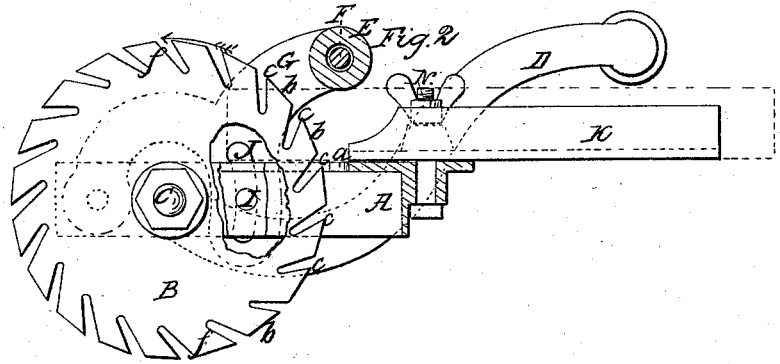
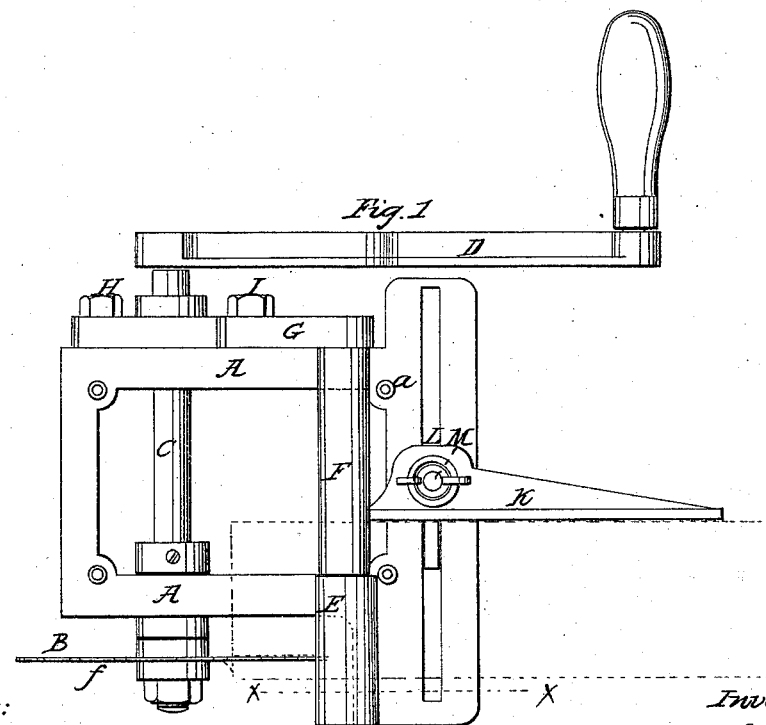
Witnesses:
Inventor:

UNITED STATES PATENT OFFICE.

T. L. YATES, OF UTICA, NEW YORK.

IMPROVEMENT IN SAWING-MACHINES.

Specification forming part of Letters Patent No. 56,138, dated July 3, 1866.

*To all whom it may concern:*

Be it known that I, T. L. YATES, of Utica, in the county of Oneida and State of New York, have invented a new and Improved Hand Sawing-Machine; and I do hereby declare that the following is a full, clear, and exact description thereof, which will enable others skilled in the art to make and use the same, reference being had to the accompanying drawings, forming a part of this specification.

In the machine embraced by the present invention the axis of the circular saw is below the table or bed on which the material is sawed, the saw cutting upward through and thus lifting the stuff from the table and carrying it along with it, and having each tooth made of such a form and inclination as to perform the double function of feeding and gaging the material to the action of the next tooth in succession by the act of the tooth cutting through said material at such an angle as will draw it forward the required distance for the back cut of each successive tooth, for the purpose of avoiding the necessity of forcing the material forward by hand or other means, and in addition to the circular saw arranged and with its teeth of the form and inclination above stated, the material is prevented from being lifted above the saw by means of a pressure and frictional roller, or other equivalent device, so arranged as to bear upon the upper surface of the stuff being sawed, and also so that it can be adjusted to the varying thicknesses of material or stuff.

In accompanying plate of drawings my improvements in hand sawing-machines are illustrated, Figure 1 being a plan or top view of the machine, and Fig. 2 a vertical section taken in the plane of the line *x x*, Fig. 1.

Similar letters of reference indicate like parts.

A in the drawings represents the table or bed-plate of the machine, on which the material to be sawed is placed, this bed A, by means of screws or other suitable fastening devices inserted in its several holes *a a*, being secured to a bench, table, or other proper place; B, the circular saw, and C its arbor or shaft, turning in suitable bearings of the bed-plate, but below its surface, upon which the material to be sawed is laid; D, a crank or winch handle secured to saw-arbor C for turning the same; K, the guide, having set and thumb screw M for securing it at any desired position in the slot L of the bed-plate, according to the width which the material or stuff is to be cut, this arrangement of the guide being similar to that in ordinary circular-saw machines.

The saw passes upward through the material or stuff being sawed, and its several teeth *b* are to be made of such a form and inclination along their edge as to both feed and gage the material to the action of the next succeeding tooth by the act of the preceding tooth cutting through said material at such an angle as will draw it forward the required distance for the cut of the next tooth, the material being held from rising above the saw, as the saw is acting upon it and cutting upward through it, by means of the pressure-roller E upon the outer end of the horizontal arm F, secured to the bent or crooked arm G, hung at one end to a fulcrum-pin, H, of the bed-plate A, on which it swings in a vertical plane, guided by its slot, J, moving over the set-screw I of bed-plate A, this pressure-roller being above the material or stuff being sawed, as plainly shown in Fig. 2, to adjust which with regard to the thickness thereof it is only necessary to loosen the set-screw I and swing the arm to which the pressure-roller is hung either up or down, as may be necessary to give the proper width or space between the bed-plate and the roller for the board or stuff which is to be sawed.

It may be here remarked, in conclusion, that by using a circular saw which is both self-gaging or self-regulating, with its axis below the table upon which the material is sawed, and cutting upward through it, it is obvious that the material, by the revolution of the saw-blade, is necessarily lifted from the table and carried forward, thus producing a uniform feed by its own action, the use of the pressure-roller E or its equivalent preventing the material from being lifted above the saw.

I claim as new and desire to secure by Letters Patent—

The combination of the roller E, arm F, slotted bent arm G, applied and operating with the gaging and feeding saw in the manner and for the purpose herein specified.

T. L. YATES.

Witnesses:
W. M. JONES,
LEONARD GIBBS.